United States Patent [19]

Kurakake

[11] Patent Number: 4,473,785
[45] Date of Patent: Sep. 25, 1984

[54] NUMERICAL CONTROL UNIT

[75] Inventor: Mitsuo Kurakake, Hino, Japan

[73] Assignee: Fujitsu Fanuc Limited, Tokyo, Japan

[21] Appl. No.: 361,922

[22] PCT Filed: Jul. 16, 1981

[86] PCT No.: PCT/JP81/00164
§ 371 Date: Mar. 15, 1982
§ 102(e) Date: Mar. 15, 1982

[87] PCT Pub. No.: WO82/00370
PCT Pub. Date: Feb. 4, 1982

[30] Foreign Application Priority Data

Jul. 17, 1980 [JP] Japan .................................. 55-97773

[51] Int. Cl.$^3$ ............................................. G05B 11/01
[52] U.S. Cl. .................................... 318/560; 307/147; 307/148
[58] Field of Search ................. 307/147, 148; 318/560

[56] References Cited

U.S. PATENT DOCUMENTS

| | | | |
|---|---|---|---|
| 4,080,759 | 3/1978 | Klar et al. | 361/415 X |
| 4,227,094 | 10/1980 | Semur | 307/147 X |
| 4,337,499 | 6/1982 | Cronin et al. | 361/415 X |

Primary Examiner—B. Dobeck
Attorney, Agent, or Firm—Staas & Halsey

[57] ABSTRACT

A numerical control unit which includes a main bus connected to (a main processor) operates, according to an execution program stored in a main memory, on data from the memory or a tape reader, and applies the results of the operation to axis-control circuits in order to perform predetermined numerical control. The main memory and buffer circuits (4a to 4c in FIG. 1) are connected to the main bus. This minimizes the electrical load on the main processor. Peripheral buses are provided for each of the buffer circuits, and peripheral hardware and the axis-control circuits of individual package units are each connected to the peripheral buses.

4 Claims, 2 Drawing Figures

NUMERICAL CONTROL UNIT

BACKGROUND OF THE INVENTION

The present invention relates to a numerical control unit, and more particularly to a numerial control unit which adopts a packaging method capable of readily dealing with an increase in the number of axes to be controlled.

A standard numerical control unit which performs data processing through the operating function of a processor controls four to five axes at most; this number is sufficient for general use but, in some cases, there is needed a numerical control unit capable of controlling ten-odd axes for some special purposes. A method that is usually considered for constituting the numerical control unit for such many-axis control is to directly connect circuits other than axis-control circuits, such as a tape reader, an NC control panel, etc., to a main bus of a main processor and to connect a required number of axis-control circuits to the main bus. With such an arrangement, however, as the number of parts connected to the main bus is markedly larger than in the case of the standard numerical control unit, the electrical load on the main processor increases and the main bus becomes huge, resulting in such inconvenience that standard circuit parts prepared for the standard numerical control unit, such as a mother board, a storage cabinet and forth, cannot be used. In general, it is advantageous in terms of manufacturing costs and stock control to standardize as many parts as possible; therefore, it is desirable that the numerical control unit for many-axis control could also be constituted using such standard parts. Further, in order for the unit to have a high degree of flexibility, it is also desired that the unit has a construction that allows ease in increasing the number of axes to be controlled.

SUMMARY OF THE INVENTION

The present invention has been initiated in view of the above and has for its object to provide a numerical control unit for many-axis control which can be constructed using parts for the standard numerical control unit and, in addition, permits easily increasing the number of axes to be controlled.

DESCRIPTION OF THE PREFERRED EMBODIMENT

For describing the present invention in more detail, its embodiment will hereinafter be described in detail.

Figure 1:
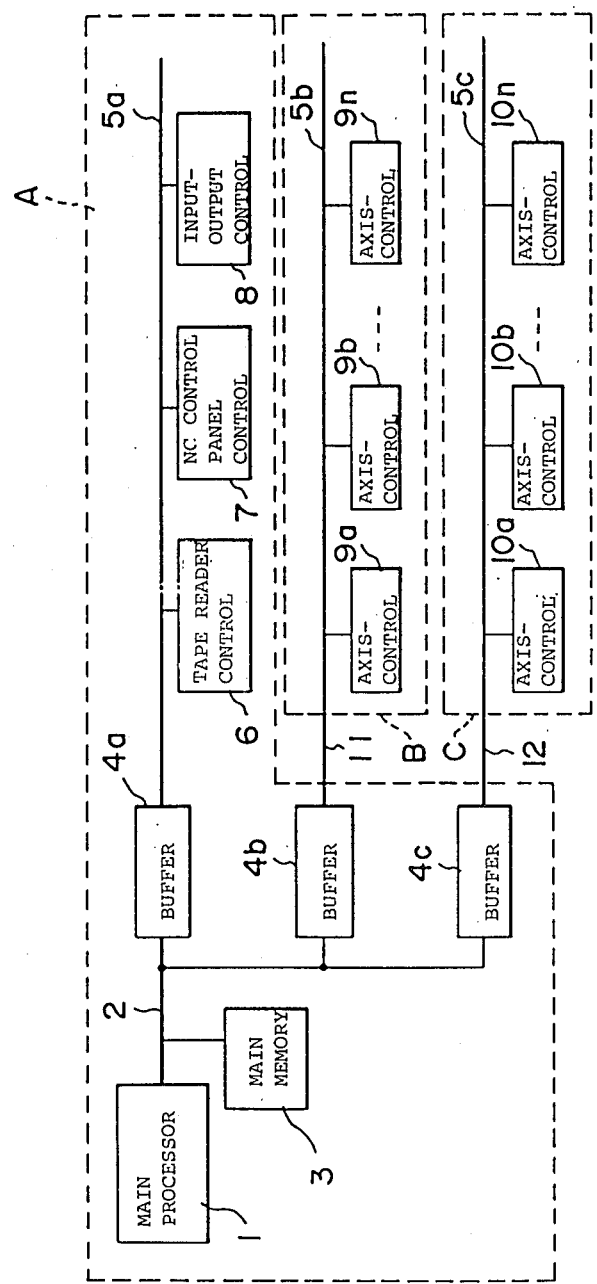
FIG. 1 is a block diagram showing the principal part of an embodiment of the unit of the present invention.

FIG. 1 illustrates in block form the principal part of the unit produced in accordance with the present invention. Reference numeral 1 indicates a main processor; 2 designates a main bus; 3 identifies a main memory; 4a to 4c denote buffer circuits; 5a to 5c represent peripheral buses; 6 shows a tape reader control circuit; 7 refers to an NC control panel control circuit; 8 indicates a control circuit for other input-output devices; 9a to 9n and 10a to 10n designate axis-control circuits; 11 and 12 identify cables; and A, B and C denote circuit blocks.

In FIG. 1, the main processor 1 performs arithmatic processing, according to an execution program stored in the main memory 3, on data from the memory 3 or a tape reader and then applies the results of the operation to the axis-control circuits 9a to 9n and 10a to 10n, executing predetermined numerical control. To the main bus 2 is connected a minimum load of the main memory 3 and the buffer circuits 4a to 4c. This is intended to prevent an increase in the electrical load on the main processor 1. The peripheral buses 5a to 5c are respectively provided for the buffer circuits 4a to 4c, and the peripheral buses 5a to 5c are each connected to a desired pieces of peripheral hardware. Incidentally, the buffer circuits 4a to 4c are each constituted, for instance, by a driver circuit and a receiver circuit.

In the unit of the present invention, the peripheral bus 5a has connected thereto circuit portions other than the axis-control circuits, such as, for example, the tape reader control circuit 6, the NC control panel control circuit 7 and the control circuit 8 for other input-output devices, and the peripheral buses 5b and 5c have connected thereto the axis-control circuits 9a to 9n and 10a to 10n, respectively. The main processor 1, the main memory 3, the buffer circuits 4a to 4c and the circuits 6, 7 and 8 connected to the peripheral bus 5a constitute the circuit block A, forming one package unit. Similarly, the axis-control circuits 9a to 9n and 10a to 10n connected to the peripheral buses 5b and 5c constitute the circuit blocks B and C, forming individual package units, respectively. The connection of the circuit blocks B and C to the circuit block A is achieved through the cables 11 and 12.

Figure 2:
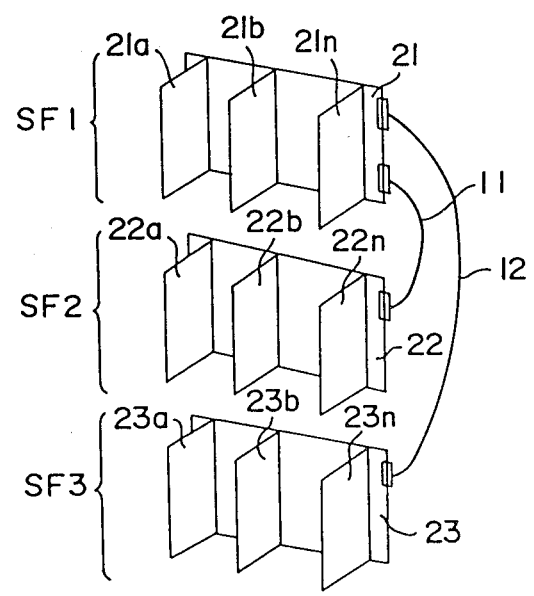
FIG. 2 is a diagram illustrating an example of packing means for use in the present invention.

The numerical control unit is packaged in a cabinet, for instance, in such a manner as shown in FIG. 2, in which printed-circuit boards 21a to 21n forming the circuit block A are mounted on a mother board 21 to produce a shelf SF1 and shelves SF2 and SF3, produced by mounting on mother boards 22 and 23 printed-circuit boards 22a to 22n and 23a to 23n constituting the circuit blocks B and C, are connected to the shelf SF1 by means of the cables 11 and 12.

According to the unit of this embodiment, as only a minimum number of circuits, such as the main memory 3 and the buffer circuits 4a to 4c are connected to the main bus 2 of the main processor 1, the electrical load on the main processor 1 does not increase. Further, the circuits other than the axis-control circuits are connected to one peripheral bus 5a and these circuits are combined into one package unit including the main processor 1 and the buffer circuits 4a to 4c. To the other peripheral buses 5b and 5c are connected only the axis-control circuits to constitute individual package units, respectively, and these blocks are connected as by cables to the circuits block A including the main processor 1. Therefore, it is possible to prevent the buses from becoming huge and the number of parts connected to one bus from increasing. This makes it possible to use an NC cabinet, power source equipment, mother boards and other parts designed for the standard numerical control unit, thus leading to advantages in terms of manufacturing costs and stock control. Moreover, since only the axis-control circuits are constituted in one package unit, the number of axes to be controlled can easily be increased.

While in the foregoing the unit is described as being arranged so that the two circuit blocks B and C are connected to the circuit block A, it is also possible to provide more circuit blocks in accordance with an increase in the number of axes to be controlled.

As will be appreciated from the foregoing description, according to the present invention, the circuits to be connected to a main bus are divided into a plurality of groups and are connected to a peripheral bus, and axis-control circuits are combined into an independent package unit. Accordingly, the number of axes to be controlled can easily be increased and, by preventing the bus from becoming huge, parts for the standard numerical control unit can be employed, which permits reduced manufacturing costs and simplified stock control.

I claim:

1. An improved numerical control unit of the type which employs a plurality of control circuits and which performs data processing using a processor having a main bus connected thereto, wherein the improvement comprises: a plurality of first circuit blocks, each with a peripheral bus having connected thereto only axis-control circuits; a second circuit block with a peripheral bus having connected thereto circuits other than the axis-control circuits; and a plurality of buffer circuits connecting the peripheral buses of the circuit blocks to the main bus of the processor, wherein the first circuit blocks including the peripheral buses having connected thereto the axis-control circuits alone and the second circuit block with the other circuits each constitute separate package units.

2. The control unit of claim 1, wherein a main memory is connected to the main bus.

3. The control unit of claim 2, wherein the peripheral bus of the second circuit block is connected to at least a tape reader control circuit, a numerical control panel control circuit, and an input/output control circuit.

4. The control unit of claim 1, wherein said circuit blocks constituting package units each comprise a mother board having printed circuit boards connected thereto, said mother boards being connected by cables.

* * * * *